(12) United States Patent
Rautila

(10) Patent No.: US 6,524,189 B1
(45) Date of Patent: Feb. 25, 2003

(54) MULTI-PLAYER GAME SYSTEM USING MOBILE TELEPHONE AND GAME UNIT

(75) Inventor: Heikki Rautila, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/350,330

(22) Filed: Jul. 9, 1999

(51) Int. Cl.⁷ ................................................ A63F 13/00
(52) U.S. Cl. .......................................... 463/40; 463/39
(58) Field of Search .............................. 463/39–43, 35, 463/16–20; 379/90.01, 93.13

(56) References Cited

U.S. PATENT DOCUMENTS

| | | | |
|---|---|---|---|
| 5,108,115 A | * | 4/1992 | Berman et al. |
| 5,397,133 A | * | 3/1995 | Penzias |
| 5,561,419 A | | 10/1996 | Sasaki et al. |
| 5,594,740 A | * | 1/1997 | La Due |
| 5,605,505 A | | 2/1997 | Han |
| 5,609,525 A | | 3/1997 | Ohno et al. |
| 5,618,045 A | * | 4/1997 | Kagan et al. |
| 5,659,596 A | * | 8/1997 | Dunn ........................... 455/456 |
| 5,702,305 A | * | 12/1997 | Norman et al. ............... 463/39 |
| 5,707,289 A | * | 1/1998 | Watsnabe et al. ............. 463/40 |
| 5,738,583 A | | 4/1998 | Comas et al. |
| 5,797,085 A | | 8/1998 | Beuk et al. |
| 5,797,091 A | * | 8/1998 | Clise et al. |
| 5,806,849 A | | 9/1998 | Rutkowski |
| 5,809,520 A | * | 9/1998 | Edwards et al. |
| 5,813,913 A | * | 9/1998 | Berner et al. |
| 5,830,069 A | * | 11/1998 | Soltesz et al. |
| 5,855,483 A | | 1/1999 | Collins et al. |
| 5,855,515 A | | 1/1999 | Pease et al. |
| 5,870,683 A | | 2/1999 | Wells et al. |
| 5,964,660 A | * | 10/1999 | James et al. |
| 5,964,830 A | * | 10/1999 | Durrett ........................ 709/200 |
| 5,973,475 A | * | 10/1999 | Canbalieziu |
| 5,995,839 A | * | 11/1999 | Coursey et al. |
| 5,999,808 A | * | 12/1999 | LaDue ........................ 463/20 |
| 6,012,984 A | * | 1/2000 | Roseman ..................... 463/42 |

(List continued on next page.)

FOREIGN PATENT DOCUMENTS

| | | |
|---|---|---|
| EP | 0 883 077 A1 | 12/1998 |
| WO | 93/23125 | * 11/1993 |
| WO | WO 98/17359 | 4/1998 |
| WO | 98/47589 | * 10/1998 |

OTHER PUBLICATIONS

O'Brien, "Wireless industry nibbles at Bluetooth" Computer Dealer News, Willowdale, Dec. 1998.*

Primary Examiner—Michael O'Neill
(74) Attorney, Agent, or Firm—Crawford PLLC

(57) ABSTRACT

A multi-player game system using a mobile telephone and a game unit is disclosed. The present invention links multiple users having game units with mobile phones using a low power radio link. The present invention includes at least one mobile phone having a first transceiver for providing connections to a cellular network and a second transceiver for providing short-haul connectivity, and a plurality of game units for interfacing with a plurality of players, each of the game units having a third transceiver for providing short-haul connectivity, wherein the mobile phones and the game units are linked by the second and third transceivers therein to enable a game to be played on the game units by the plurality of players. In at least one of the mobile phones, the second transceiver is a short range wireless transceiver. At least one mobile phone is used to download a game to the game units and the game units include a group selection interface for choosing players to include in a gaming group. The mobile phones may be linked to a base station, a game server and a network interconnecting the base station and the game server, wherein the game server provides a game across the network and base station to the mobile phones for play on the game units.

29 Claims, 6 Drawing Sheets

U.S. PATENT DOCUMENTS 6,028,866 A * 2/2000 Engel et al.
6,050,898 A * 4/2000 Vange et al.
6,080,064 A * 6/2000 Pieterse et al.
6,084,584 A * 7/2000 Nahi et al.
6,106,399 A * 8/2000 Baker et al. .................. 463/42
6,117,013 A * 9/2000 Eiba
6,164,531 A * 12/2000 Harris et al.
6,169,902 B1 * 1/2001 Kawamoto
6,256,019 B1 * 7/2001 Allport

* cited by examiner

Fig. 5a

Games in location
<none>
Players in location
Player 1#

Fig. 5b

Challenge by Player 2
Game ID: POK42

Accept   Reject

Fig. 5c

Games in location
POK42
Players in location
PLAYER 1 / POK42#
PLAYER 2 / POK42#

Fig. 5d

Games in location
POK42
Players in location
PLAYER 1 / POK42#
PLAYER 2 / POK42#
PLAYER 3 / <none>#

Fig. 5e

Challenge by Player 4
Game ID: BLACKJACK

Accept   Reject

Fig. 5f

Games in location
POK42
POKRR
Players in location
PLAYER 1 / POK42#
PLAYER 2 / POK42#
PLAYER 3 / BLACKJACK#
PLAYER 4 / BLACKJACK#

MULTI-PLAYER GAME SYSTEM USING MOBILE TELEPHONE AND GAME UNIT

BACKGROUND OF THE INVENTION

1. Field of the Invention

This invention relates in general to interactive games, and more particularly to a multi-player game system using mobile telephones and game units.

2. Description of Related Art

Wireless mobile communications continues to expand at a rapid pace and will continue to do so for at least the next decade. Over 100 million people were using a mobile service by the end of 1995, and that number is expected to grow to 300 million by the year 2000. Several factors are contributing to the exciting growth in the telecommunications industry. For example, a combination of technology and competition bring more value to consumers. Phones are smaller, lighter, had a longer battery life, and are affordable now for the mass market. Operators are providing excellent voice quality, innovative services, and roaming across the country or world. Most important, mobility is becoming less expensive for people to use. Around the world, as well as in the United States, governments are licensing additional spectrum for new operators to compete with traditional cellular operators. Competition brings innovation, new services, and lower prices for consumers.

For cellular telephony to continue its spectacular growth, it must handle more subscribers per base station and higher—bandwidth services. One interesting application which relies upon at least some of the above mentioned technologies is interactive hard-core computer enthusiast. For instance, online gaming required arcane skills belonging only to computer savvy users. However, online gaming has become easier for the more casual user. In fact, online gaming is rapidly becoming one of the most popular activities on the Internet.

Most important to interactive gaming enthusiast is the ability to connect with other enthusiasts who may be located at remote locations. The convergence of telecommunications and computer technology has lead to portable computers being able to connect to the Internet using wireless modems and also to cellular phones, which include games.

The above-mentioned wireless networks provide the possibility to play the same game between different playing devices or game units without regard to geographic or physical location. However, the mobile phone, which is used for calls, might not be the best device for playing. Game units with joysticks, keypads, etc. have been developed. Such game units are better suited for games, even if the mobile phone is a popular game device.

Prior interactive multiple player game systems have included two playing devices that communicate with each other over an all-to-all broadcast network so that two or more players, each playing on their own playing device, are in a wireless communication with the other players. Thus, each player can participate in a game scenario common to all the playing devices. However, while the players are playing the same game, they cannot select with whom they play with or the members of the group that they will play.

It can be seen that there is a need for a method and apparatus that provides a multiplayer game system using the mobile telephone and a game unit.

It can also be seen that there is a need for a method and apparatus that allows configuration of an interactive game between users using a mobile telephone and a game unit.

SUMMARY OF THE INVENTION

To overcome the limitations in the prior art described above, and to overcome other limitations that will become apparent upon reading and understanding the present specification, the present invention discloses a multi-player game system using a mobile telephone and a game unit.

The present invention solves the above-described problems by linking multiple users having game units with mobile phones provided with the first transceiver for connecting to cellular network and second transceiver for connecting short range line (low power RF). The mobile telephone provides a good basis to link game services and game data.

A system in accordance with the principles of the present invention includes a mobile phone having a first transceiver for providing connections to a cellular network and a second transceiver for providing short-haul connectivity and a game unit for interfacing with a player, the game unit having a third transceiver for providing short-haul connectivity, wherein the mobile phone and the game unit are linked by the transceivers therein to enable a game to be played on the game unit.

Other embodiments of a system in accordance with the principles of the invention may include alternative or optional additional aspects. One such aspect of the present invention is that the game unit comprises a group selection interface for choosing a player to include in a gaming group.

Another aspect of the present invention is that the second and third transceiver comprises short range wireless transceivers.

Another aspect of the present invention is that the short range wireless transceivers comprises modules designed according to a Bluetooth specification.

Another aspect of the present invention is that the short range wireless transceivers comprises infrared transceivers.

Another aspect of the present invention is that the short range wireless transceivers comprises universal asynchronous receiver/transceivers (UARTs).

Another aspect of the present invention is that the transceivers enable a game to be downloaded to the game unit.

Another aspect of the present invention is that the system further includes a base station, a game server and a network interconnecting the base station and the game server.

Another aspect of the present invention is that the game server provides a game across the network and base station to the at least one mobile phone for play on the game units.

Another aspect of the present invention is that a game system includes a mobile phone having a first transceiver for providing connections to a cellular network and a second transceiver for providing short-haul connectivity and a plurality of game units for interfacing with a plurality of players, each of the game units having a third transceiver for providing short-haul connectivity, wherein at least one mobile phone and the game units are linked by the second and third transceivers therein to enable a game to be played on the game units by the plurality of players.

Another aspect of the present invention is that a mobile phone includes a keypad for providing user input, a speaker and microphone for providing audio data to a user, a display for displaying information concerning the mobile phone to a user, a first transceiver for providing connections to a cellular network, a second transceiver for providing short-haul connectivity and a controller, coupling the keypad, speaker and microphone, display and transceiver, for processing data.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIGS. 5a–f illustrate message displays during game selection according to the present invention.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a multi-player game system using a mobile telephone and a game unit. Multiple users having game units are linked with mobile phones using a low power radio link.

Figure 1:
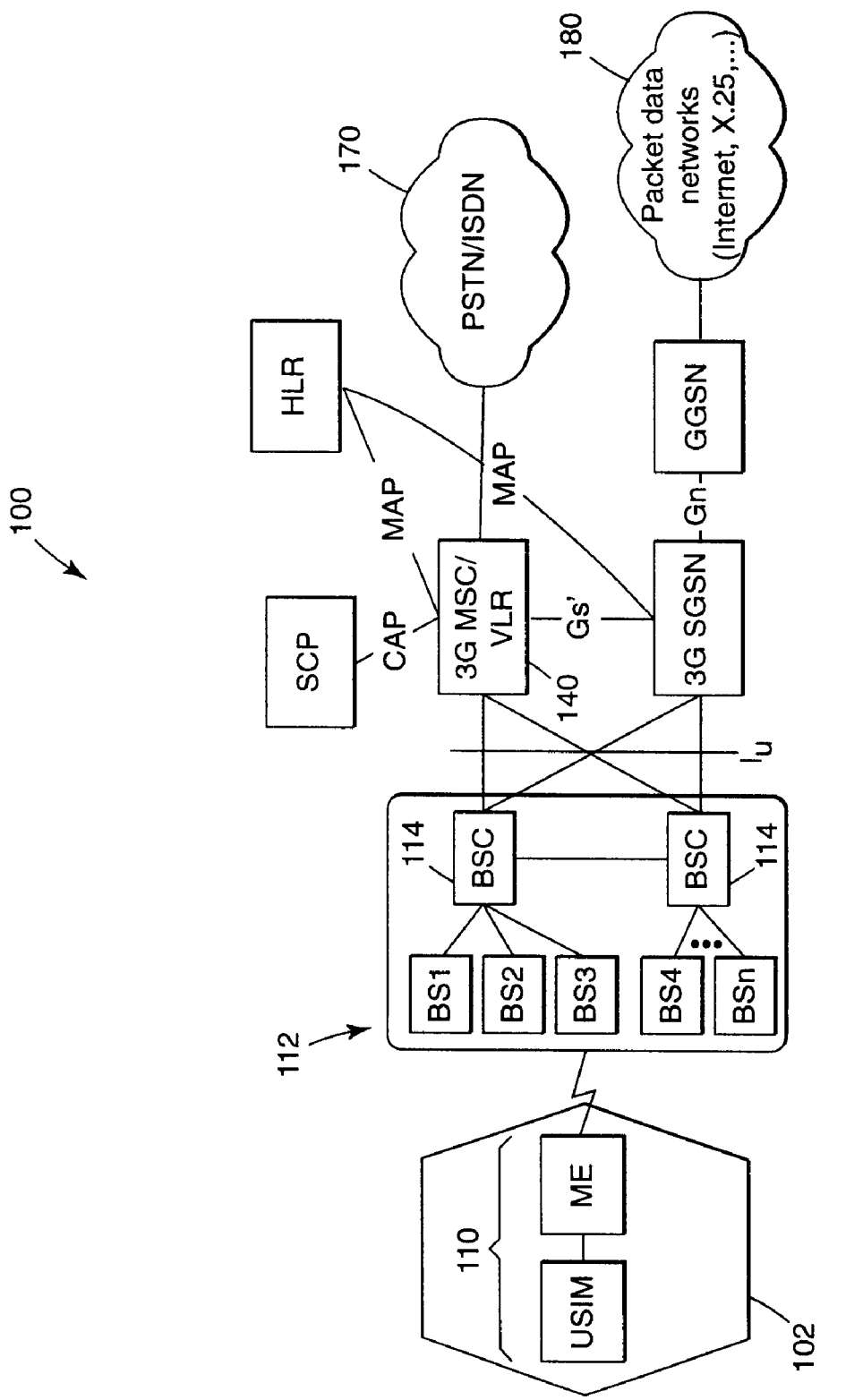
FIG. 1 illustrates one possible embodiment of an advanced communication network.

FIG. 1 illustrates a GSM network 100. Those skilled in the art will recognize that the present invention is not meant to be limited to use -with GSM mobile communication systems, but is applicable to other mobile communication systems. However, the present invention will be described herein using GSM as an example.

FIG. 1 shows schematically a telecommunications network 100. The network 100 includes a number of base stations (BSs) 112. Each base station 112 has a radio transceiver (not shown) capable of transmitting radio signals to and receiving radio signals from the area of an associated cell 102. By means of these signals, the base station can communicate with the mobile station 110 which may be a mobile station in the associated cell 102. This mobile station 110 includes at least a radio transceiver for cellular networks. Each base station is connected via a base station controller (BSC) 114 to a mobile switching center (MSC) 140. The MSC 140 is linked to the PSTN 170 or to other mobile switching centers (not shown). By means of this system, a user of the mobile station 110 can establish a telephone call or corresponding connection to a destination which can be, for example, a subscriber in the PSTN 170 or another mobile station in the network 100, or even a terminal in a computer network (not shown). The connection from the MSC 140 to packet data networks, like the Internet and X.25 180, can be accomplished through the PSTN 170 or directly from the MSC 140.

Corporate Local Area Networks (LANs) are connected through routers and links such as T1 lines to the Internet. Personal computers and laptop computers can be connected to the Internet Service Providers (ISPs) via dial up links. The ISPs each having Dynamic Host Configuration Protocol (DHCP) servers that provides users with a temporary IP address to connect to the Internet. These ISPs also have Domain Name Service (DNS) servers, which provide addresses to the users, i.e., they translate domain names into IP addresses. This provides easier recognition based on domain name versus IP addresses. DNS servers point to each other for address resolution. The residential consumer has an increasing requirement for bandwidth to the home to support access to interactive multimedia services including Internet access. The access is done, for example, by the modem connecting the home computer to the Data Information Provider or Corporate LAN over the PSTN. The data modem uses the existing phone line into the home and phone calls cannot be made while the data modem is in operation. ISDN is deployed over a separate facility and provides for two channels that can be used for data access or for telephone service. The mobile phone can connect to the data service by calling to the ISP and establishing a data call. The application, like a game, is then possible to download to the mobile phone. The downloading is possible through the short-range link, such as an infrared link or low power RF link from the computer to the mobile phone just as it is possible to download e-mail messages by using the Nokia 6110 mobile phone for example.

Figure 2:
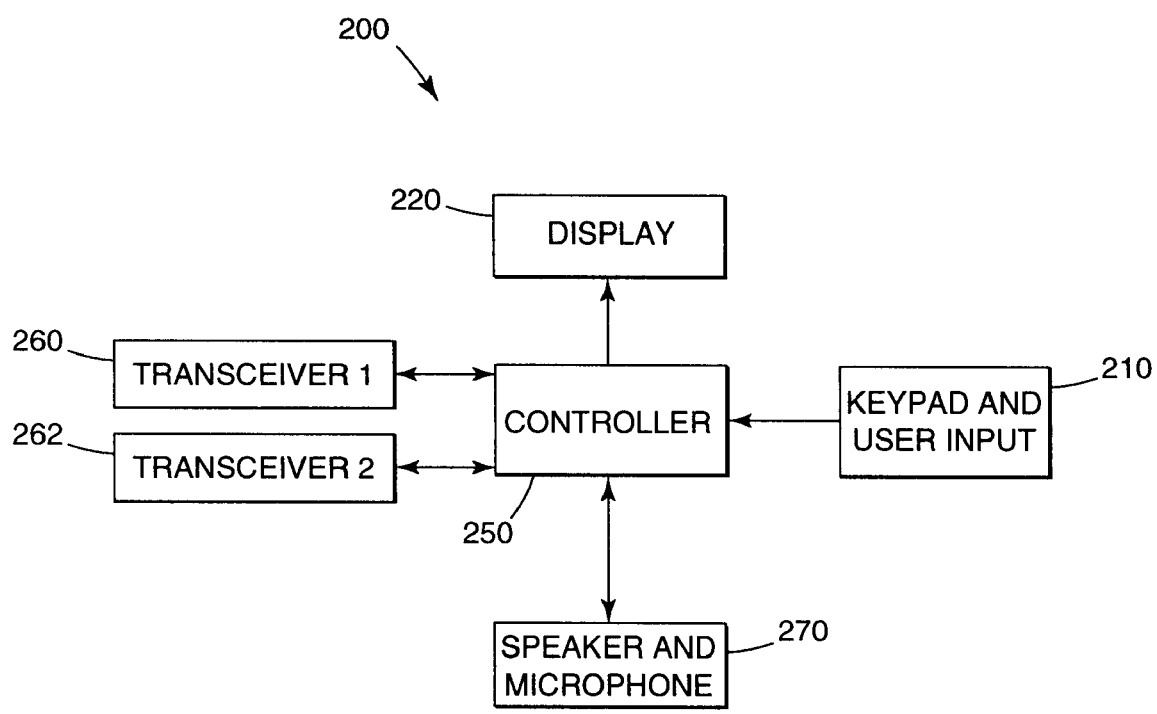
FIG. 2 illustrates a block diagram of a mobile phone.

FIG. 2 illustrates a block diagram of a mobile phone 200. The mobile phone includes a keypad 210 for dialing, for controlling menu operation and for entering phone control functions. The mobile phone also includes a display 220. The display 220 may be used to show keypad entries, such as a number to be dialed, number lookup commands, phone setup commands, etc. In addition, the display 220 may be used to display a representation of a game. For example, the phone may include games programmed therein that the user may play while not using the other functions of the phone. A controller 250 processes the user inputs and controls the display 220. The mobile phone 200 also include a first transceiver 260 for providing connections to a cellular network and a low power RF transceiver 262, such as a Bluetooth radio module as discussed below, for providing short-haul connectivity. A speaker and microphone 270 provide signals which are processed by the controller 250.

Figure 3:
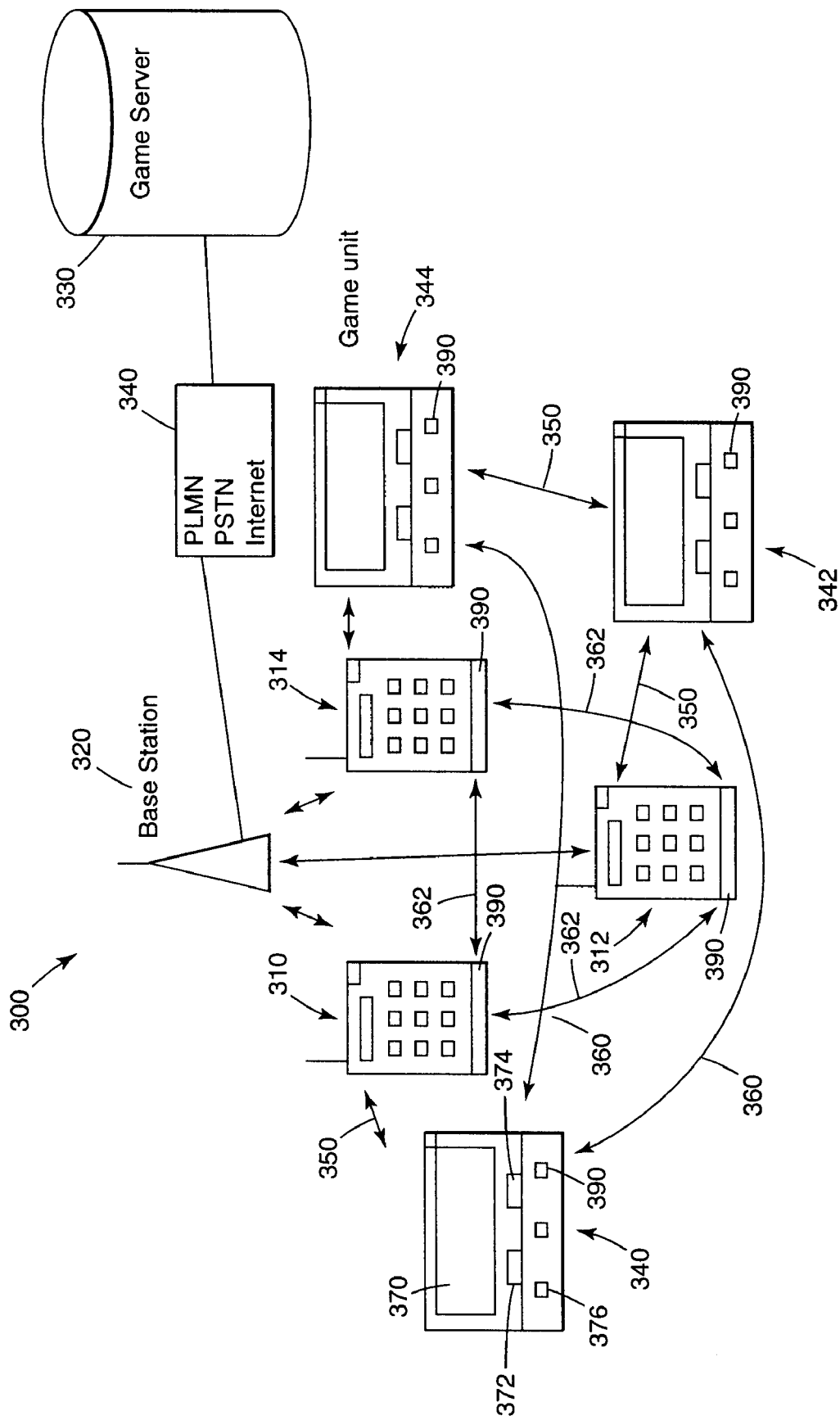
FIG. 3 illustrates a multi-player game system according to the present invention.

FIG. 3 illustrates a multi-player game system 300 according to the present invention. In FIG. 3, mobile phones 310, 312, 314 are coupled in a game scenario through a base station 320. The base station 320 is connected to a game server 330 via a network 340. Each mobile phone 310, 312, 314 include a game unit 340, 342, 344 respectively.

According to the present invention, the mobile telephones 310, 312, 414 include a small transmitter that uses short range radio links. The game units 340, 342, 344 also include a short range radio. The mobile telephone 310, 312, 314 are connected to each other by a short range radio communication link or, alternatively, through the public land mobile network (PLMN). The users may be linked together under the control of the game units 340, 343, 344 via a radio link 360, via a link 370 between the game units 340, 343, 344 and the mobile phones 310, 312, 314, or via short range link 362 between the mobile phones 310, 312, 314.

The game can be downloaded from the network and they are sent through the mobile telephones 310, 312, 314 and the low power RF links 350 to the game units 340, 342, 344. The game units 340, 342, 344 may include a display 370, a processor (represented by 372), keys 374, and a joystick 376 for moving play characters in the display and for controlling other activities, such as firing, activating thrust, etc. Those skilled in the art will recognize that the invention is not meant to be limited to any particular player/game interfaces, but that other player/game interfaces are possible.

One mobile telephone 310 can link more than one game 340, 342 unit to the network 340 thus enabling multiple game units 340, 342 to play games through a single mobile telephone 310. In addition, the playing device itself 340 may contain radio unit in order to connect to the PLMN.

The communication needed for grouping can be arranged based upon short distance wireless transceiver 390 to establish links 362, e.g., infrared or radio. For example, a low level communication protocol such as the UART that is commonly used in micro-controllers may be used. UART stands for Universal Asynchronous Receiver/Transmitter and is a computer component that handles asynchronous serial communication. Every computer contains a UART to manage the serial ports, and all internal modems have their own UART. Due to the low amount of data being transferred, the data rate does not need to be very high. Typically, the commonly available data rate is in the area of 1200–1400 bits per second (bps).

Another example involves using a Bluetooth radio modules according to which have been proposed in unregulated spectrum such as 2.4 GHz as the low power RF transceiver. Bluetooth is a low-cost, short-haul wireless scheme that sends and receives data via cell phone, portable computer, or other device over a 2.4 GHz spread-spectrum technology. Data rates for the technology are targeted at 1 M bit per second, but the Bluetooth Special Interest Group (BSIG) is aiming for 2 M bits per second in the future. Bluetooth can be used by a point-to-point or point-to-multi-point system. Bluetooth modules in the mobile telephone and in the game unit, respectively can communicate with each other. The playing devices 340, 342, 344 may be "chosen" using group selector interface 380 in a group selection process, for example by using a Bluetooth button, that enables two or more players to be configured into a single group of players that will play a single game. The players can address with whom they want to play, especially in a location where there are many combinations of players possible. Thus, each game may be limited to a selected group of players, while in the same location a second game may be independently played by a second selected group of players.

Figure 4:
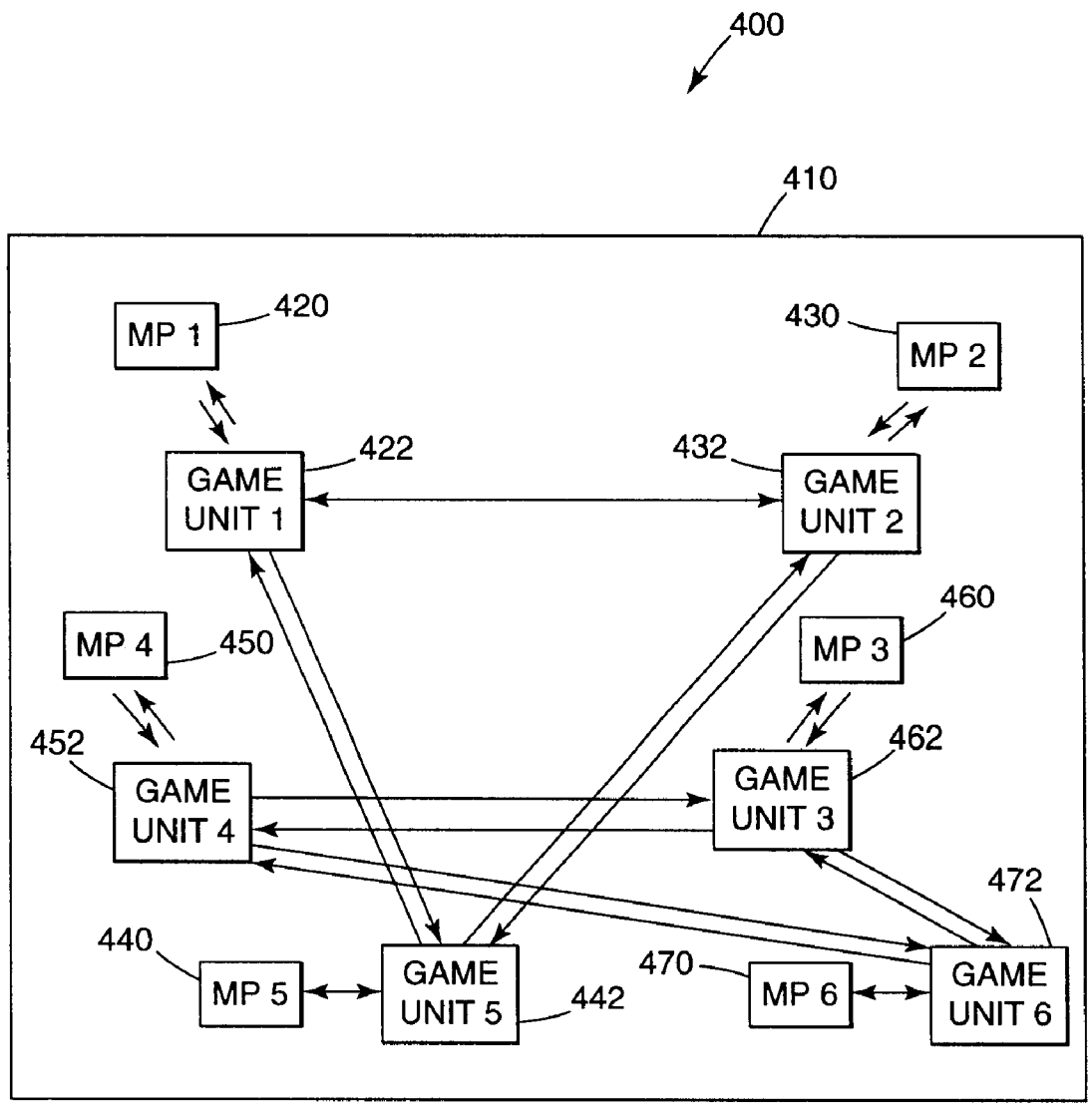
FIG. 4 illustrates a multiple game/single location scenario that may be configured by the players according to the present invention.

FIG. 4 illustrates a multiple game/single location scenario 400 that may be configured by the players according to the present invention. In FIG. 4, game unit 1 422, game unit 2 432 and game unit 5 442 have been configured to play a first game. Game unit 1 422, game unit 2 432 and game unit 5 442 are coupled to the network (not shown) via mobile phones 420, 430, 440 respectively.

Similarly, game unit 4 452, game unit 3 462 and game unit 6 472 have been configured to play a second game. Game unit 4 452, game unit 3 462 and game unit 6 472 are coupled to the network (not shown) via mobile phones 450, 460, 470 respectively.

Accordingly, as shown in FIG. 4, six players represented by the game units 422, 432, 442, 452, 462, 472 may break down into two games which may be played in a single physical or geographic location 410.

Those skilled in the art will recognize that short range links between the mobile phones 420, 430, 440, 450, 460, 470 as discussed above with reference to FIG. 3 may also be used. However, for clarity these links are not shown in FIG. 4.

FIGS. 5a–f illustrate message displays during game selection according to the present invention. First, player 1 enters a location. At this point player 1 does not need to take any action. At some subsequent time, a second player enters the location. Player 2 selects in his display, as shown in FIG. 5a, to challenge player 1 who is detected as being ready for entering into a game. Then, player 1 receives a message as illustrated in FIG. 5b. Player 1 may accept or reject the challenge to a game of poker (POK42), for example.

Next, player 3 enters the location and looks for ongoing games in the vicinity. The display of FIG. 5c is provided to player 3. Player 3 observes that player 1 and player 2 have entered into a game of poker. Player 3 is not interested in joining player 1 and player 2 in their game. Therefore, player 3 waits.

Player 4 enters the location and looks for ongoing games in the vicinity. The display of FIG. 5d is provided to player 4. Player 4 issues a challenge to player 3 as illustrated in FIG. 5e. Player 3 accepts and player 3 and player 4 enter into a game of blackjack, for example, as illustrated in FIG. 5f.

Thereafter, player 5 may, for example, join player 1 and 2 in their game of poker and player 6 may, for example, join player 3 and player 4 in their game of blackjack. Alternatively, player 5 may wait until another player enters the location in hope of initiating some type of new game.

Figure 6:
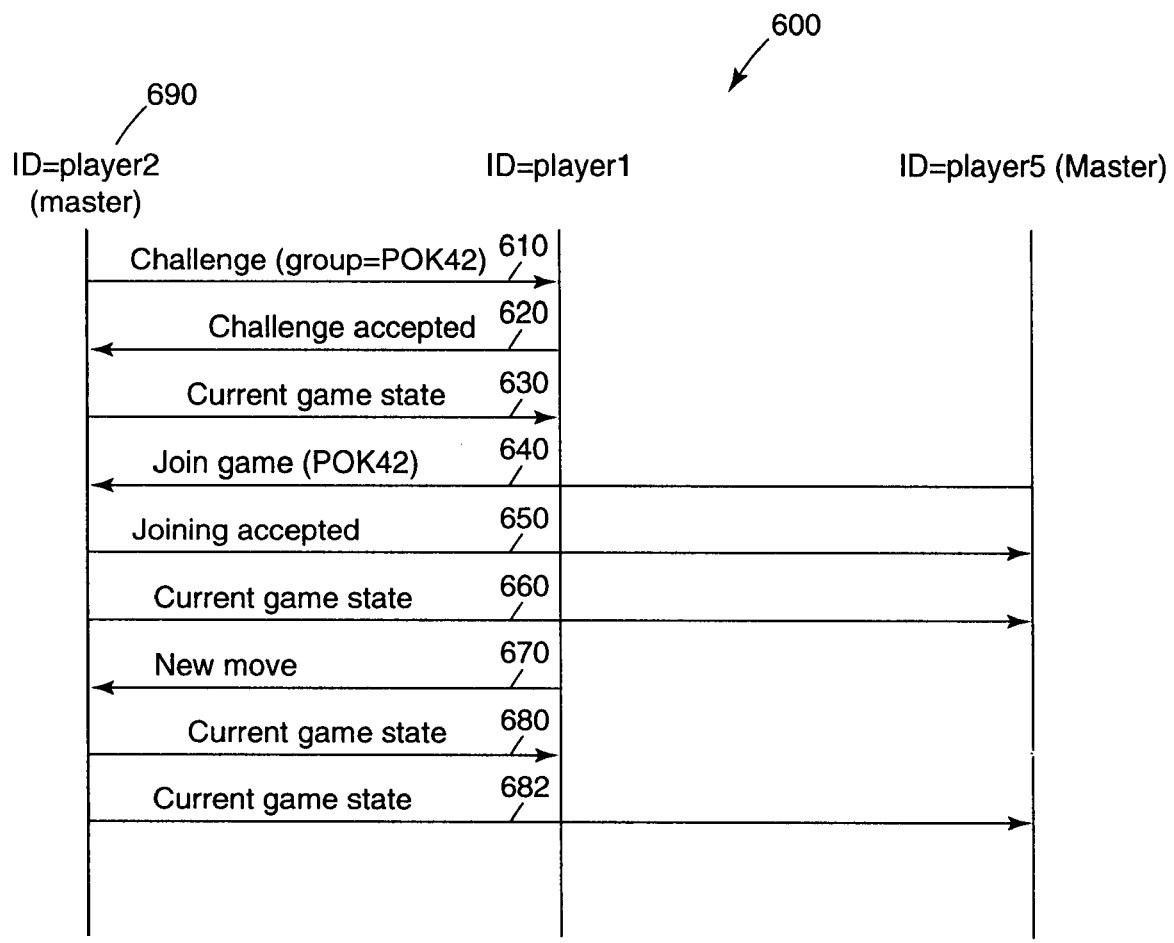
FIG. 6 illustrates the signaling for game selection discussed above with reference to FIGS. 5a–f.

FIG. 6 illustrates the signaling 600 for game selection discussed above with reference to FIGS. 5a–f. A game challenge is presented from player 2 to player 1 610. Player 1 accepts the challenge by sending a message to player 2 620. Player 2 sends player 1 the current game state 630. Player 5 requests to join the game 640. Player 2 sends a message to player 5 indicating the request for joining the game is accepted 650. The current game state is provided from player 2 to player 5 660. Player 1 initiates a new move which is indicated to player 2 670. Player 2 returns the current game state to player 1 680 and to player 5 682.

Regardless of how the coupling of the game groups is performed, one of the players must act as a game master for the others (without knowledge of it or at least without being informed of it). In FIG. 6, it can be seen that player 2 is the master 690. The master unit 690 needs to store the following information:

name of the current game;
   the identification and addresses of all players in the current game;
   any game related information needed by the players (constantly); and
   game state information for all players participating.
   Each of the players need to store:
   the name of the current game;
   the identification of the game masters; and
   the game state information last retrieved from the master.

Those skilled in the art will recognize that the invention is not meant to be limited to the types of games illustrated above. Further, additional embodiments of the game selection procedure may be implemented without departing form the scope of the present invention. Moreover, those skilled in the art will recognize that the message displays may be provided for presentation on the mobile phones or on the game devices.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A game system, comprising:
   a mobile phone having a first transceiver for providing connections to a cellular network and a second wireless transceiver; and
   a game unit for interfacing with a player, the game unit having a third wireless transceiver;
   wherein the mobile phone and the game unit bypass the cellular network through a wireless link formed by the second and third wireless transceivers to enable a game to be played on the game unit.

2. The game system of claim 1 wherein the game unit comprises a group selection interface for choosing a player to include in a gaming group.

3. The game system of claim 1 wherein the wireless transceivers comprise modules designed according to a Bluetooth specification.

4. The game system of claim 1 wherein the wireless transceivers comprise infrared transceivers.

5. The game system of claim 1 wherein the wireless transceivers comprise universal asynchronous receiver/transceivers (UARTs).

6. The game system of claim 1 wherein the transceivers enable a game to be downloaded to the game unit.

7. An interactive game system, comprising:
   a mobile phone having a first transceiver for providing connections to a cellular network and a second wireless transceiver; and
   a plurality of game units for interfacing with a plurality of players, each of the game units having a third wireless transceiver;
   wherein at least one mobile phone and the game units bypass the cellular network through links formed by the second and third wireless transceivers therein to enable a game to be played on the game units by the plurality of players.

8. The interactive game system of claim 7 wherein the wireless transceivers comprise modules designed according to a Bluetooth specification.

9. The interactive game system of claim 7 wherein the wireless transceivers comprise infrared transceivers.

10. The interactive game system of claim 7 wherein the wireless transceivers comprise universal asynchronous receiver/transceivers (UARTs).

11. The interactive game system of claim 7 wherein the at least one mobile phone is used to download a game to the game units.

12. The interactive game system of claim 8 wherein the at least one mobile phone comprises a group selection interface for choosing players to include in a gaming group.

13. The interactive game system of claim 8 wherein the at least one mobile phone comprises mobile phones associated with each of the game units.

14. The interactive game system of claim 13 wherein each of the game units are linked to an associated mobile phone by the second transceiver.

15. The interactive game system of claim 7 further comprising a base station, and a game server, wherein the cellular network interconnects the base station and the game server, and wherein the mobile phone communicates with the game server via the base station via the first transceiver.

16. The interactive game system of claim 15 wherein the game server provides a game across the network and base station to the at least one mobile phone for play on the game units.

17. The interactive game system of claim 7 wherein the plurality of game units bypass the cellular network using the third transceiver to allow a game to be played between players using the plurality of game units.

18. A mobile phone, comprising:
   a keypad for providing user input;
   a speaker and microphone for providing audio data to a user;
   a display for displaying information concerning the mobile phone to a user;
   a first transceiver for providing connections to a cellular network;
   a second wireless transceiver for bypassing the cellular network to provide wireless interactive gaming connectivity; and
   a controller, coupling the keypad, speaker arid microphone, display and first and second transceivers, for processing data.

19. The mobile phone of claim 18 wherein the second wireless transceiver comprises a transceiver for linking to a game unit.

20. The mobile phone of claim 19 herein the game unit comprises a group selection interface for choosing a player to include in a gaming group.

21. The mobile phone of claim 18 further comprising a group selection interface for choosing a player to include in a gaming group.

22. A method for playing a game, comprising:
   displaying a game on a plurality of game units;
   linking the plurality of game units to at least one mobile phone of a cellular network using a transceiver to bypass the cellular network; and
   sending game signals from the mobile phone to a game server for processing.

23. The method of claim 22 further comprising communicating directly between the plurality of game units using a transceiver to allow a game to be played between players using the plurality of game units.

24. A method for playing a game, comprising:
   displaying a game on a plurality of game units; and
   linking each of the game units to an associated mobile phone of a cellular network, each mobile phone and game unit including a transceiver to bypass the cellular network for providing the link between the game units and the associated mobile phone.

25. The method of claim 24 further comprising downloading a game program from a game server to a game unit using an associated mobile phone.

26. The method of claim 24 further comprising selecting a gaming group among the plurality of game units using a group selection process.

27. A method for playing a game, comprising:
   establishing a first player using a mobile terminal of a cellular network as a master;
   forming a gaming group using the master; and
   providing a signal from the mobile terminal of the master to at least a mobile terminal of a second player in the gaming group for controlling game parameters while bypassing the cellular network.

28. The method of claim 27 wherein the master stores the name of the current game, the identification and addresses of all players in the current game, game related information needed by the players and game state information for all players participating in the game.

29. The method of claim 27 wherein each of the first and at least second player need to store the name of the current game, the identification of the master and the game state information last retrieved from the master.

* * * * *

UNITED STATES PATENT AND TRADEMARK OFFICE
CERTIFICATE OF CORRECTION

PATENT NO. : 6,524,189 B1 Page 1 of 1
DATED : February 25, 2003
INVENTOR(S) : Heikki Rautila It is certified that error appears in the above-identified patent and that said Letters Patent is hereby corrected as shown below:

Column 1,
Line 19, "had a longer battery life" should read -- have a longer battery life --.
Line 32, "interactive hard-core computer enthusiast." should read -- interactive gaming. Previously, this interactive gaming has been relegated to users who are hard-core computer enthusiasts. --.
Line 41, "computer technology has lead to portable" should read -- computer technology has led to portable --.

Column 2,
Lines 33, 36 and 38, "wireless transceivers comprises" should read -- wireless transceivers comprise -- .

Column 8,
Line 12, "a controller, coupling the keypad, speaker arid" should read -- a controller, coupling the keypad, speaker and --.
Line 18, "The mobile phone of claim 19 herein the game unit" should read -- The mobile phone of claim 19 wherein the game unit --.

Signed and Sealed this

Eighth Day of July, 2003

JAMES E. ROGAN
*Director of the United States Patent and Trademark Office*